June 5, 1951 R. L. SMITH 2,556,115
COOKER
Filed Dec. 10, 1945 2 Sheets-Sheet 1

INVENTOR.
ROBERT LEQUEUX SMITH
BY
A. B. Bowman
ATTORNEY

June 5, 1951  R. L. SMITH  2,556,115
COOKER

Filed Dec. 10, 1945  2 Sheets-Sheet 2

INVENTOR.
ROBERT LEQUEUX SMITH
BY
A. B. Bowman
ATTORNEY

Patented June 5, 1951

2,556,115

UNITED STATES PATENT OFFICE 2,556,115

COOKER

Robert Lequeux Smith, San Diego, Calif.

Application December 10, 1945, Serial No. 634,033

1 Claim. (Cl. 99—417)

My invention relates to a cooker, more particularly a cooker in which the food is mechanically suspended in the heating medium and the objects of my invention are:

First, to provide a cooker of this class in which great quantities of food may be cooked evenly and thoroughly without the use of a stirring device whereby the food particles remain in natural form and retain their appearance;

Second, to provide a cooker of this class in which the cellular structure of foods cooked therein is preserved whereby vitamins and minerals are retained in the food;

Third, to provide a cooker of this class in which food may be thoroughly cooked without any attention to the disposition of the food relatively to the heated kettle;

Fourth, to provide a cooker of this class in which tender vegetables may be thoroughly cooked and which vegetables will retain their color, shape, flavor, texture and identity, together with a high vitamin content throughout the cooking process;

Fifth, to provide a cooker of this class in which the food does not contact the heated surface of the kettle;

Sixth, to provide a cooker of this class in which the temperature of the heating medium therein surrounding the food being cooked remains at a fairly constant temperature;

Seventh, to provide a suspension cooker of this class which operates equally well as a steam cooker or a water cooker;

Eighth, to provide a cooker of this class which is particularly adapted for use in efficient basting operations in connection with the cooking of various meats or the like;

Ninth, to provide a cooker of this class which makes possible the utilization of unskilled labor in the production of great quantities of palatable food; and Tenth, to provide a cooker of this class which is very simple and economical of construction, efficient in its action and which will not readily deteriorate or get out of order.

Figure 1:
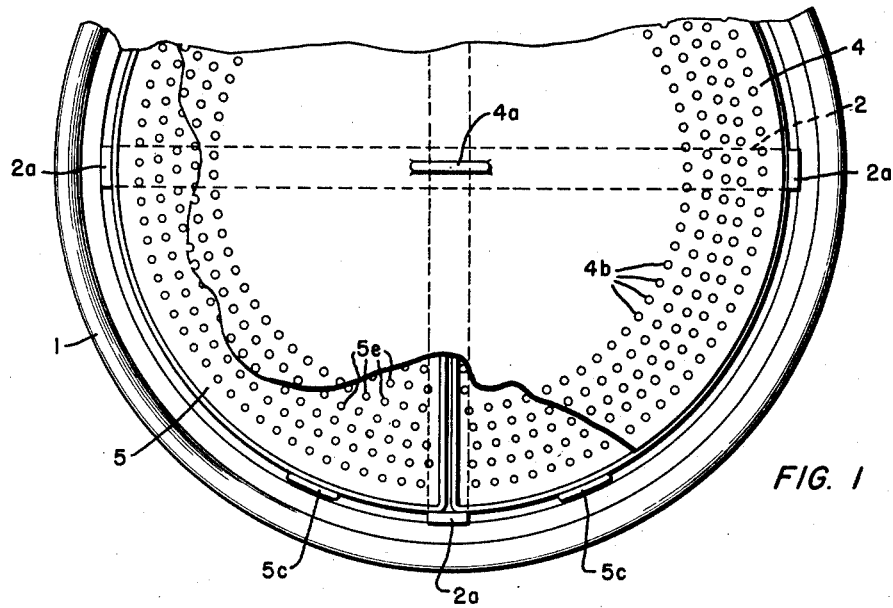
Figure 2:
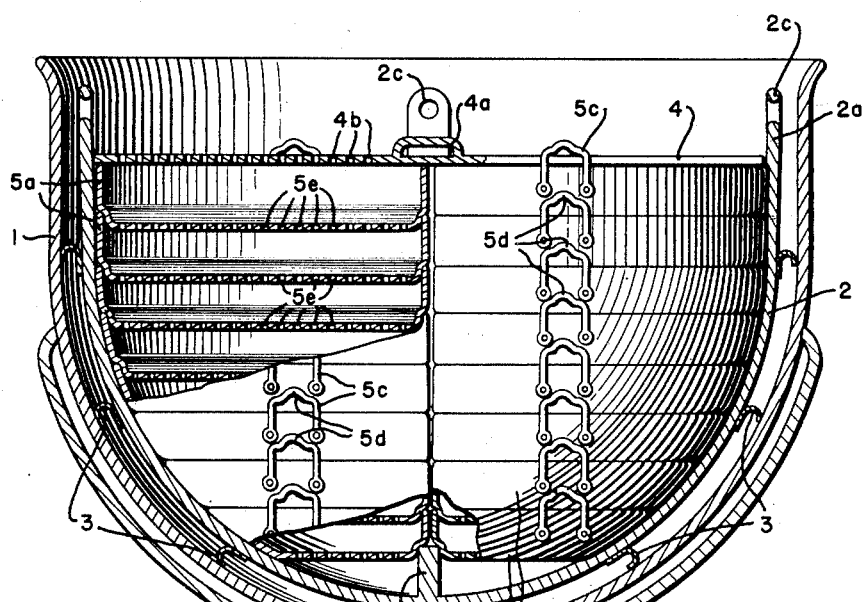
Figure 3:
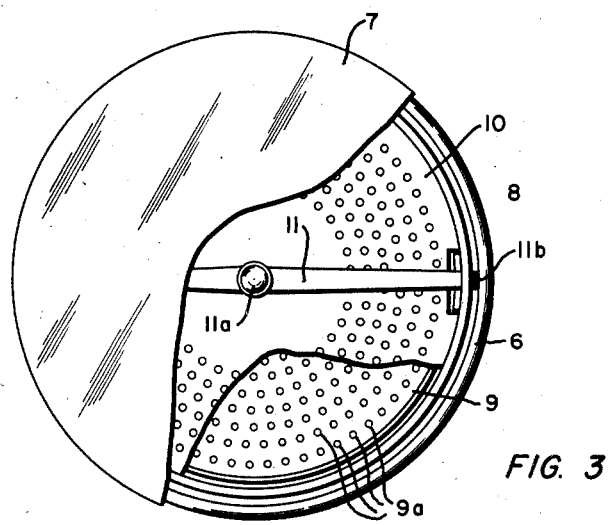
Figure 4:
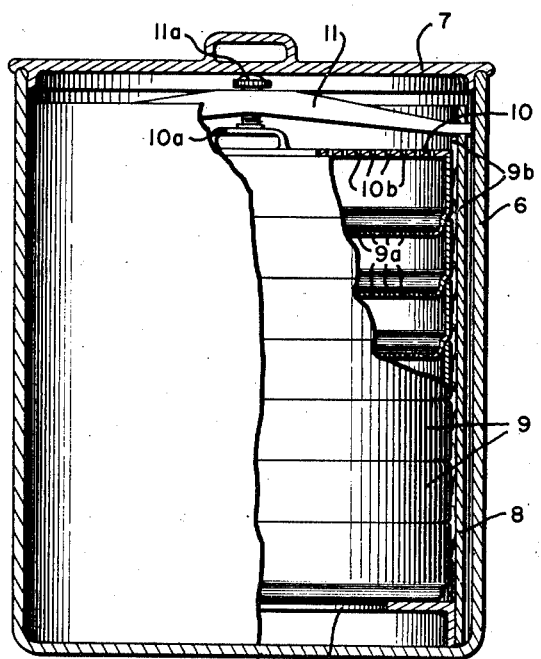

With these and other objects in view as will appear hereinafter, my invention consists of certain novel features of construction, combination and arrangement of parts and portions, as will be hereinafter described in detail and particularly set forth in the appended claims. Reference being had to the accompanying drawings and to the characters of reference thereon forming a part of this application in which:

Fig. 1 is a fragmentary top or plan view of my cooker, showing portions broken away to amplify the illustration; Fig. 2 is a side elevational view of my cooker, showing portions broken away and in section to amplify the illustration; Fig. 3 is a top or plan view of a modified form of my cooker, showing portions broken away to amplify the illustration; and Fig. 4 is a side elevational view of the modified form of my cooker, showing portions broken away and in section to amplify the illustration.

Similar characters of reference refer to similar parts and portions through the several views of the drawing.

The kettle 1, frame 2, steam baffles 3, cover 4, and pans 5 constitute the principal parts and portions of my cooker.

The kettle 1 may be of any desired construction such as the steam kettle type illustrated or may be heated by other means as desired. The kettle 1, as illustrated in Fig. 2 of the drawings, is provided with a steam jacket 1a, and inner heated surface 1b arranged to conduct heat to liquid in the kettle 1 surrounding the frame 2, and pans 5 if desired. The frame 2 consists of a plurality of radially disposed frame members 2a, which supports the pans 5 in nested relation to each other, as shown in Fig. 2 of the drawings. This frame 2 is provided with a section pan locating portion 2b at the bottom thereof engaging the lower pans 5, maintaining the same in laterally disposed position to each other. Extending around the radially and upwardly extending frame portions 2a are the steam baffles 3. These steam baffles 3 form restricting channels intermediate the walls of the kettle 1 and the pans 5, tending to direct the steam for circulating heating medium upwardly through the perforations in the pans 5. Each of these pans 5 is provided with a straight upper edge 5a, which fits into the formed surrounding ledge portion 5b of the adjacent pans, providing a very secure and stable nested relation of the pans 5 in the frame 2.

The cover 4 is positioned over the pans 5 inside the frame 2 and is provided with perforations 4b and a handle portion 4a near the middle thereof, for convenience in removal thereof. Each end of the pans 5 is provided with a handle 5c at opposite sides for convenience in removing the same from the frame 2. These handles 5c are each provided with raised looped portions 5d arranged to be engaged by hooks or the like when removing the pans 5 by various mechanical means.

It will be here noted that the frame portions 2a are each provided with looped portions 2c at their upper ends which may be engaged by hooks or the like for removal of the frame 2. Thus it is possible to remove all of the pans 5 at once or remove them individually as needed.

It will be here noted that the pans 5 are each provided with perforated portions 5e throughout the bottoms and sides thereof for the circulation of the heating medium therethrough, from one pan to the other, providing means for transferring the heat equally throughout the pans 5.

It will be noted that the pans 5 are bisected, as shown in Fig. 1 of the drawings, and are so constructed when made in large sizes so that they may be handled without undue effort.

The operation of my cooker is substantially as follows:

When the pans 5 are placed in the kettle 1, in connection with the frame 2, as shown in Fig. 2 of the drawing, the lowermost pan 5 is substantially above the heated surface 1b of the kettle 1, preventing food in the lower pan 5 from contacting the hot surface of the kettle 1b and burning thereon. If desired, a small amount of water may be placed in the lower portion of the kettle 1 and the food to be cooked may be placed in the pans 5 above the water level whereby the food in the pans 5 is steamed therein through holes 5e. If desired, water may be placed in the kettle in sufficient amount to cover the pans 5 for cooking the food therein by the simmering process, wherein the liquid is substantially uniform in temperature throughout all of the pans 5 and passes through the openings 5e therein from one pan to the other, uniformly cooking all of the food in the pans 5. When using the steam process for cooking meats or the like, after having been browned, the stock may be drained off the bottom of the kettle 1 and poured over the meat in the pans 5, which basting material gravitates downwardly from one pan to the next through the openings 5e, efficiently basting all of the meats being cooked.

It will be here noted that most of the large kettles used in this class of cooking, are provided with a drain cock at the bottom thereof, for use in drawing off the stock for basting purposes. This drain cock is not shown in the drawings but may obviously be used in connection with my cooker.

When serving the cooked food, from my cooker, all of the pans 5 may be removed if desired by removing the frame 2 or the pans 5 may be individually removed from the frame 2 as needed.

It will be here noted that the suspension of the food in the various pans 5 prevents the weight of the food from crushing itself during the cooking operation, also the suspension of the food by the pans 5 eliminates the necessity for stirring the food in order to evenly cook the same. This suspension of food in the pans 5 permits the food to be cooked without disturbance whereby the cellular structure of the food is undisturbed and as a result thereof, all of the vitamins and minerals are retained therein.

The operation of this suspension cooker in cooking rice is particularly advantageous due to the suspension of the rice, preventing the same from sticking together in one mass. The shallow displacement of each layer of rice in the pans 5 permits the same to retain its shape and proper moisture content. The control of the heating medium by the baffles 3 insures penetration of the pans 5 by the rising heating medium. In the modification, as shown in Figs. 3 and 4, the parts are designated as follows:

The kettle 6, kettle cover 7, casing 8, pans 9, pan cover 10 and cover bar 11.

The kettle 6 may be varying in size from the large production model to the household kitchen utensil size. The cover 7 is substantially conventional and the casing 8 is normally arranged in concentric relation inside the kettle 6, as shown best in Fig. 4 of the drawings, and is a hollow cylindrical casing having an open bottom portion 8a. This casing 8, however, may be varied in construction and may assume substantially the construction of the frame 2, as shown in Fig. 2 of the drawings, if desired. The pans 9 are supported in the casing 8 above the bottom heated surface 6a of the kettle 6 and are provided with perforated portions 9a, as shown in Fig. 3 of the drawings. These pans 9 also are provided with the same nesting structure as described in connection with the pans 5 as illustrated in Figs. 1 and 2 of the drawings. Handles 9b are secured in connection with the pans 9 for use in removing the same and these handles 9b are substantially the same in construction as shown in Figs. 1 and 2 of the drawings. The pan cover 10 is provided with perforations 10b, is secured in place by the screw 11a, screw threaded in the cover bar 11 bearing on the handle 10a, all as shown best in Fig. 4 of the drawings, it being noted that the end portions 11b of the cover bar 11 are positioned in openings in the upper portions of the casing 8, permitting considerable force to be used in clamping the cover 10 in place.

The construction of the modified form of my cooker, as shown in Figs. 3 and 4 of the drawings, lends itself to the production of household cooking utensils but may be used in larger cooking vessels if desired.

Though I have shown and described a particular construction, combination and arrangement of parts and portions and a certain modification, I do not wish to be limited to the particular construction, combination and arrangement or to the modification, but desire to include in the scope of my invention the construction, combination and arrangement substantially as set forth in the appended claims.

Having thus described my invention, what I claim as new, and desire to secure by Letters Patent is:

In a cooker of the class described, the combination of a kettle, a plurality of pans having perforated bottom portions arranged in superimposed relation to each other, positioned in said kettle, said pans having integral bottom and side portions, the lower portion of each of said pans having diametrically offset annular ledge portions and adapted to rest upon the upper edge of adjacent pans, a frame having portions supporting and conforming with the periphery of all of said pans, and in spaced conforming relation with the bottom and side wall portions of said kettle positioned in said kettle in spaced relation to the heated surface thereof supporting said pans and steam baffle means in connection with said frame outwardly of said pans adjacent the walls of said kettle.

ROBERT LEQUEUX SMITH.

REFERENCES CITED

The following references are of record in the file of this patent:

UNITED STATES PATENTS

| Number | Name | Date |
|---|---|---|
| 1,454,856 | O'Brien | May 15, 1923 |
| 1,755,918 | Fagley | Apr. 22, 1930 |
| 2,185,372 | Gano | Jan. 2, 1940 |
| 2,186,855 | Baccarini | Jan. 9, 1940 |
| 2,389,117 | Bensel | Nov. 20, 1945 |

FOREIGN PATENTS

| Number | Country | Date |
|---|---|---|
| 58,616 | Switzerland | Nov. 7, 1911 |
| 118,203 | Switzerland | Dec. 16, 1926 |
| 233,656 | Germany | Apr. 15, 1911 |
| 463,435 | Great Britain | Mar. 30, 1937 |